March 24, 1925.                     1,530,804
M. ANUNDI
BUOY
Filed Aug. 9, 1924
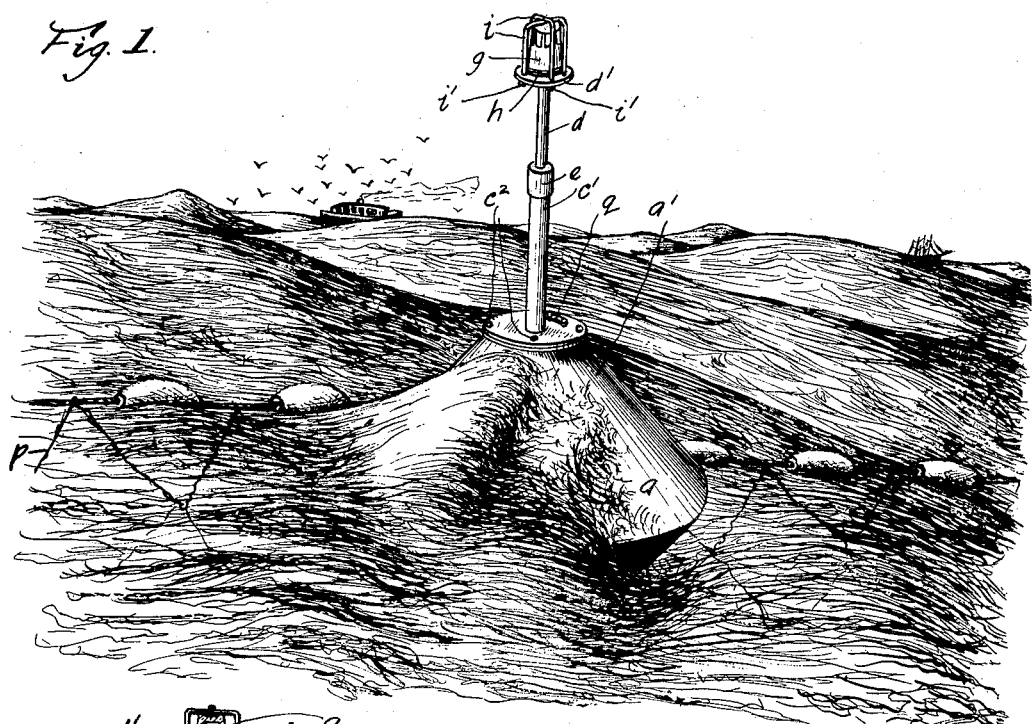
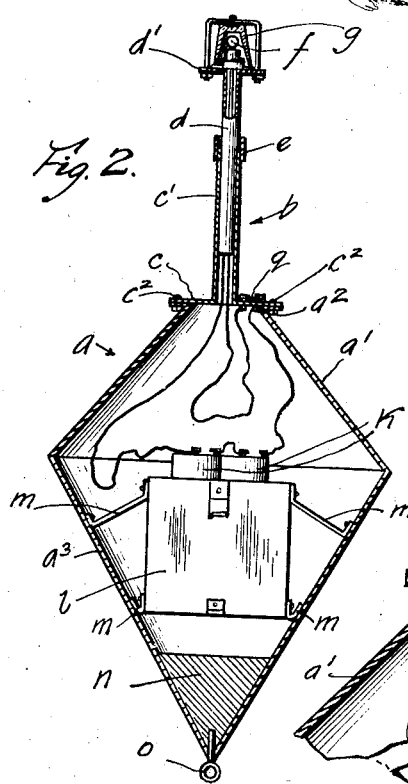
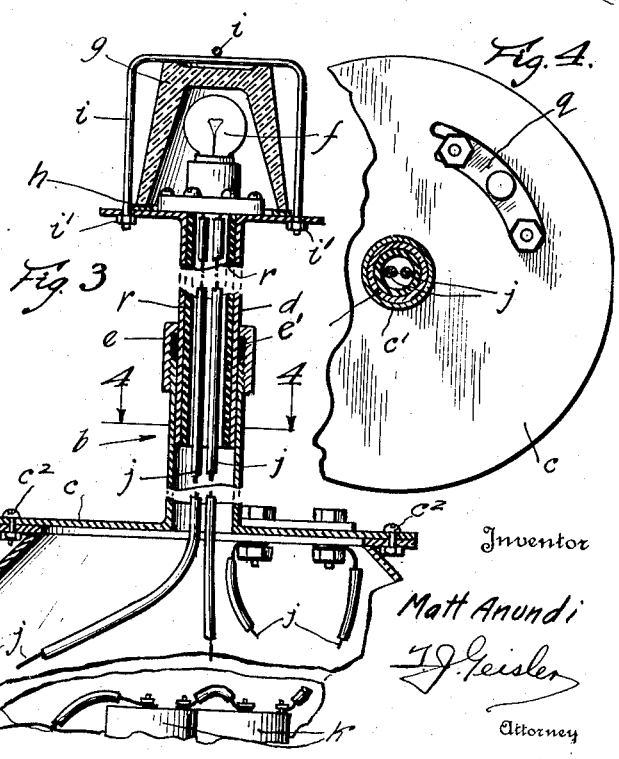
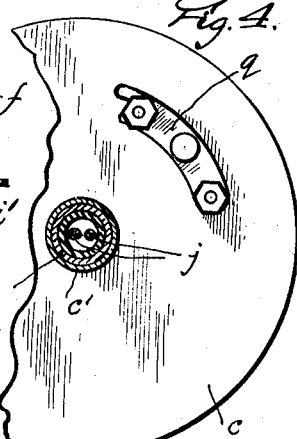

Patented Mar. 24, 1925.

1,530,804

UNITED STATES PATENT OFFICE.

MATT ANUNDI, OF CLATSKANIE, OREGON.

BUOY.

Application filed August 9, 1924. Serial No. 731,074.

*To all whom it may concern:*

Be it known that I, MATT ANUNDI, a citizen of the United States, and a resident of Clatskanie, county of Columbia, State of Oregon, have invented a certain new and useful Improvement in Buoys, of which the following is a specification.

The object of my invention is to provide an illuminable buoy or marker which is especially adapted for use in marking fishing nets or the like, which is visible in rough seas, which is sturdy of construction and which may be collapsed so as to occupy only a small portion of the space in a boat when being carried about, and also to prevent injury to the projecting portions.

A further object of my invention is to provide an illuminable buoy of this character which is provided with a telescopic light holding means, the parts of which are so constructed that the buoy can be wholly submerged beneath the surface of the water without leaking or without interfering with the illuminable means.

A further and more specific object is to provide an improvement upon my electrically illuminated buoy which is described in Patent No. 1,481,583 granted on January 22, 1924, to myself.

I have discovered that buoys constructed as shown in the patent mentioned are satisfactory when used on a body of water on which waves and swells of considerable height are not raised by rough weather. In case of rough weather, however, the waves or swells tend to conceal the buoy and make them very difficult to locate and thus I have found it necessary to provide a lighting means which will extend above the surface of the water a greater distance. If the buoy itself is made to extend further above the surface of the water, it is necessary that the portion which extends below the surface of the water be made proportionately larger also, which increases the size, as well as the cost, of making the buoy. I have discovered that if an extensible tubular support is provided with telescoping sections, the light can be raised a sufficient distance above the surface of the water to be plainly visible without increasing unduly the size of the buoy or without increasing the tendency of the buoy to overturn. To provide additional strength in this tubular support without increasing its weight I preferably reinforce the metallic tubular sections with a composition material which has relatively great strength for its weight and I insert this material within the metallic tubing section so as to prevent it from becoming affected by the water.

The details of construction and mode of operation are hereinafter described with reference to the drawings:

In the drawings:

Fig. 1 is a peripheral view of my improved buoy diagrammatically shown as attached to a fishing net and illustrating how the light holding means when extended is plainly visible above the surface of the water, even in rough weather;

Fig. 2 is a longitudinal section through my buoy with the extensible light holding means shown partly extended;

Fig. 3 is an enlarged fragmentary view of the extensible light holding means and of the electrical connections; and Fig. 4 is a fragmentary horizontal section taken on the line 4—4 of Fig. 3.

My improved buoy is made up with a body $a$ which has the form of a double cone with their bases connected, the upper cone portion $a'$ being truncated. The cone portion $a'$ is provided with a laterally extending flange $a^2$ around this cut-off portion and upon this flange the light holding means $b$ is mounted. The light holding means is made up with a flat circular section $c$ fastened to the flange $a^2$, by bolts $c^2$. A tubular section $c'$ extends centrally upwardly from the portion $c$ and in this tubular section $c'$ the movable tubular section $d$ is slidably mounted. The upper end of the tubular section $c'$ is provided with an adjustable stuffing box $e$, not only to prevent moisture from being admitted between the sliding portions and thus passing into the interior of the body of the buoy, but also to provide a means for holding the movable tubular section $c'$ in set position. That is, by tightening the threaded stuffing it will pack the material $e'$ so tightly about the tubular section that it tends to remain in set position.

The upper end of the tubular section $d$ terminates in a flat circular disc $d'$ which serves as a support for the light $f$. I provide a transparent cover $g$ for the light which is preferably a small sized tumbler which is spaced a slight distance from the bulb of the light and which is of sufficient thickness to withstand considerable rough usage. The tumbler is inverted and is mounted upon a gasket $h$ and two U-shaped clamps $i$ are provided to hold the cover $g$ in place. These clamps extend through the flat portion $d'$ and are provided with nuts $i'$ on the under surface thereof which provide tightening means for holding the cover in position.

The tubular sections $c'$ and $d$ provide conduits for the electric wires $j$ which conduct the electric current to the light $f$ from the batteries $k$. The batteries are carried in the lower cone shaped portion $a^3$ of the buoy in an open topped receptacle $l$ carried centrally in the buoy and held by brackets $m$. The buoy is provided with a weight $n$ which tends to hold the buoy upright in the water and a fastening ring $o$ is provided in the bottom of the lower cone shaped portion $a^3$ to provide a fastening means for attaching the buoy to the article to which the marker which in Fig. 1 is shown as a fishing net $p$. I provide a switch $q$ exteriorally of the buoy for connecting and disconnecting the current to the light.

I preferably provide a tubular section of material $r$ within the tubular section $d$ for reinforcing the same without materially adding to the weight. This material is preferably of relatively tough resilient material such for example as fiber board which is able to withstand considerable rough usage without fracture and thus serves to support the tubing $d$ against collapse without increasing the weight to such an extent as to tend to overturn the buoy when the tubing is fully extended, and the light is in its highest position.

I claim:

1. In a buoy, a hollow body, weighted to float upright, an extensible tubular support extending upwardly from and communicating with said hollow body, and electric signal carried by the upper end of said support, and electrical connections between said battery element and said signal, said connections passing through said tubular support.

2. In a buoy, a hollow body, weighted to float upright, an extensible tubular support extending upwardly from said hollow body, a signal carried upon said support, means for holding said extensible support in set position, said means also constituting sealing means between the extensible sections of said tubular support.

MATT ANUNDI.